No. 734,488. PATENTED JULY 21, 1903.
F. P. WISEBURN & L. BUHLE.
BUNDLING APPARATUS.
APPLICATION FILED MAY 8, 1903.
NO MODEL.
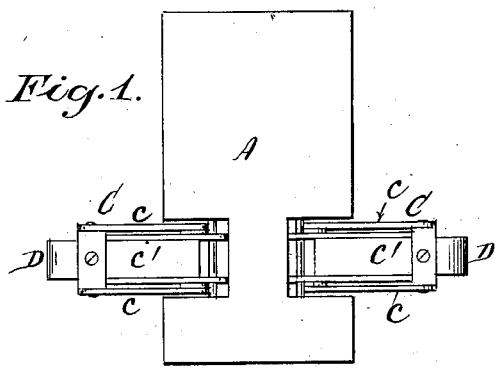
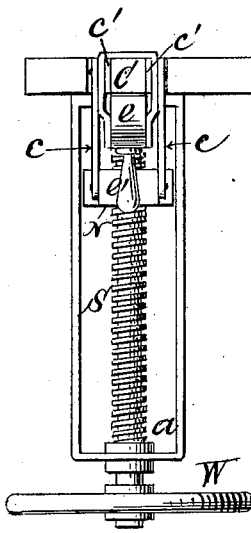
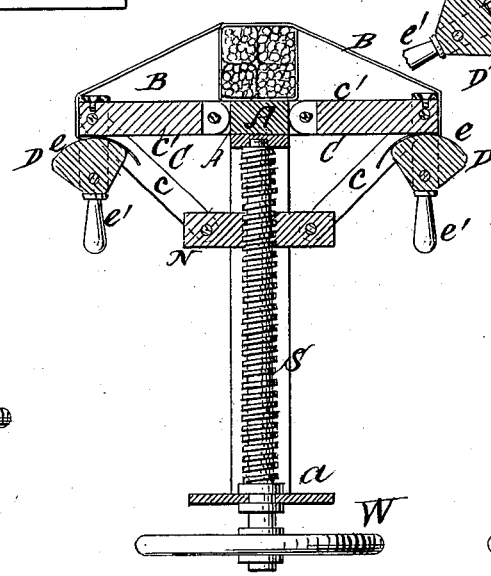
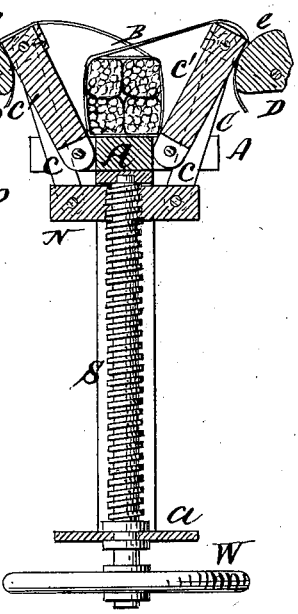
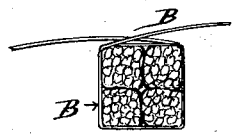
Witnesses:
D. W. Gardner.
Frank E. Roach
Inventors:
Frank P. Wiseburn
Louis Buhle
By their Attorney
Geo. Wm. Miatt No. 734,488. Patented July 21, 1903.

UNITED STATES PATENT OFFICE.

FRANK P. WISEBURN, OF NEW YORK, AND LOUIS BUHLE, OF WOODHAVEN, NEW YORK, ASSIGNORS TO PATENT TOBACCO SAMPLE BINDER COMPANY, OF NEW YORK, N. Y.

BUNDLING APPARATUS.

SPECIFICATION forming part of Letters Patent No. 734,488, dated July 21, 1903.

Application filed May 8, 1903. Serial No. 156,150. (No model.)

*To all whom it may concern:*

Be it known that we, FRANK P. WISEBURN, residing in the city of New York, borough of Brooklyn, county of Kings, and LOUIS BUHLE, residing at Woodhaven, Queens county, State of New York, citizens of the United States, have invented certain new and useful Improvements in Bundling Apparatus, of which the following is a specification, sufficient to enable others skilled in the art to which the invention appertains to make and use the same.

Our invention relates to means for binding and securing hands or hanks of tobacco or other material of a compressible nature, and is an improvement on the structure set forth in our Patent No. 674,148, dated May 14, 1901.

The invention consists in the special construction and arrangement of parts herein-after shown and described and claimed specifically.

In the accompanying drawings we have shown and described our apparatus as applied to the bundling of samples of tobacco, although we do not confine ourselves to such use, since it is obvious that it may be put to similar uses with like result.

The main object of our invention is to dispense with the straddling-straps described in our above-mentioned patent and to provide means in lieu thereof by which the pressure of the securing-band is more evenly and quickly applied to the sample or other bundle.

In the accompanying drawings, Figure 1 is a plan of the apparatus. Fig. 2 is an end elevation; Figs. 3 and 4, sectional elevations showing the band-tightening levers in two positions; Fig. 5, a diagram showing the method of binding the sample.

A is the table of the apparatus, and $a$ $a$ cross-head rigidly supported with relation thereto. Mounted upon and between the table and the cross-head is the screw S, carrying the traveling nut N and provided with a hand-wheel W. The lower members $c$ of the toggle-levers C are pivotally secured to the traveling nut N, while the upper members $c'$ of said toggle-levers are pivotally connected to the table. Two lower members $c$ $c$ are provided for each upper member $c'$ of the toggle-lever C, said upper member $c'$ being relatively broad and constituting practically extensions of the table when brought into the horizontal position, as shown in Fig. 3.

Each toggle-lever C carries a clamping device D, preferably attached to the upper members $c'$. These clamps D are for the purpose of holding the binding-tape and may obviously be varied in form from that shown without departing from the spirit and intent of our invention, which contemplates the substitution and use of any mechanical expedient for the purpose. As shown, the clamps consist of eccentrics $e$, provided with handles $e'$, arranged to clamp the tape between the eccentric surfaces and the opposed surfaces of the upper members $c'$ of the toggle-levers C.

The operation is as follows: The screw being turned to raise the traveling nut N, so as to bring the toggle-levers approximately into the position shown in Fig. 4, the bundle of samples or other material to be secured is laid upon the table between the upper members $c'$ $c'$ of the toggle-levers and the binder B wound around the bundle, drawn taut, and secured by the clamps D, when the traveling nut N is lowered by the rotation of the handle W until the required degree of tension is attained, when the securing-staple is driven through the binder B, as fully described in our said patent hereinbefore mentioned, as well as in our Patent No. 677,488, dated July 2, 1901, for this form of bundle, after which the binder is severed and the bundle released.

What we claim as our invention, and desire to secure by Letters Patent, is—

1. In a compressing and binding device, the combination of a supporting-table, an actuating-screw, a traveling nut, engaging with and actuated by said screw, and toggle-levers interposed between and pivotally connected to the said table and said traveling nut, together with clamping devices carried by said toggle-levers and adapted to hold the binding-strip by which the bundle is compressed and secured, substantially as herein set forth.

2. In a compressing and binding device, the combination of the supporting-table A, screw S, and traveling nut N, of the toggle-levers C, interposed between and pivotally connected to the table A, and traveling nut N, and provided with clamping devices D, for holding the band to be applied to the package, substantially as herein set forth.

3. In a compressing and binding device, the combination of a supporting-table A, the cross-head $a$, the screw S, the traveling nut N, the toggle-levers C, the lower members $c$, of which are pivotally connected with the traveling nut N, and to the upper levers $c'$, which latter are pivotally connected to the table, and the clamping devices D, mounted upon the upper members $c'$, of said toggle-levers C, for the purpose and substantially in the manner set forth.

FRANK P. WISEBURN.
LOUIS BUHLE.

Witnesses:
D. W. GARDNER,
FRANK E. ROACH.